Oct. 28, 1969 M. MASONSON 3,475,688
MULTICHANNEL RECEIVING SYSTEM IN WHICH EACH CHANNEL'S WEIGHT IN THE COMBINED OUTPUT DEPENDS ON THE RATE OF FADING IN SAID CHANNELS
Filed Jan. 18, 1966
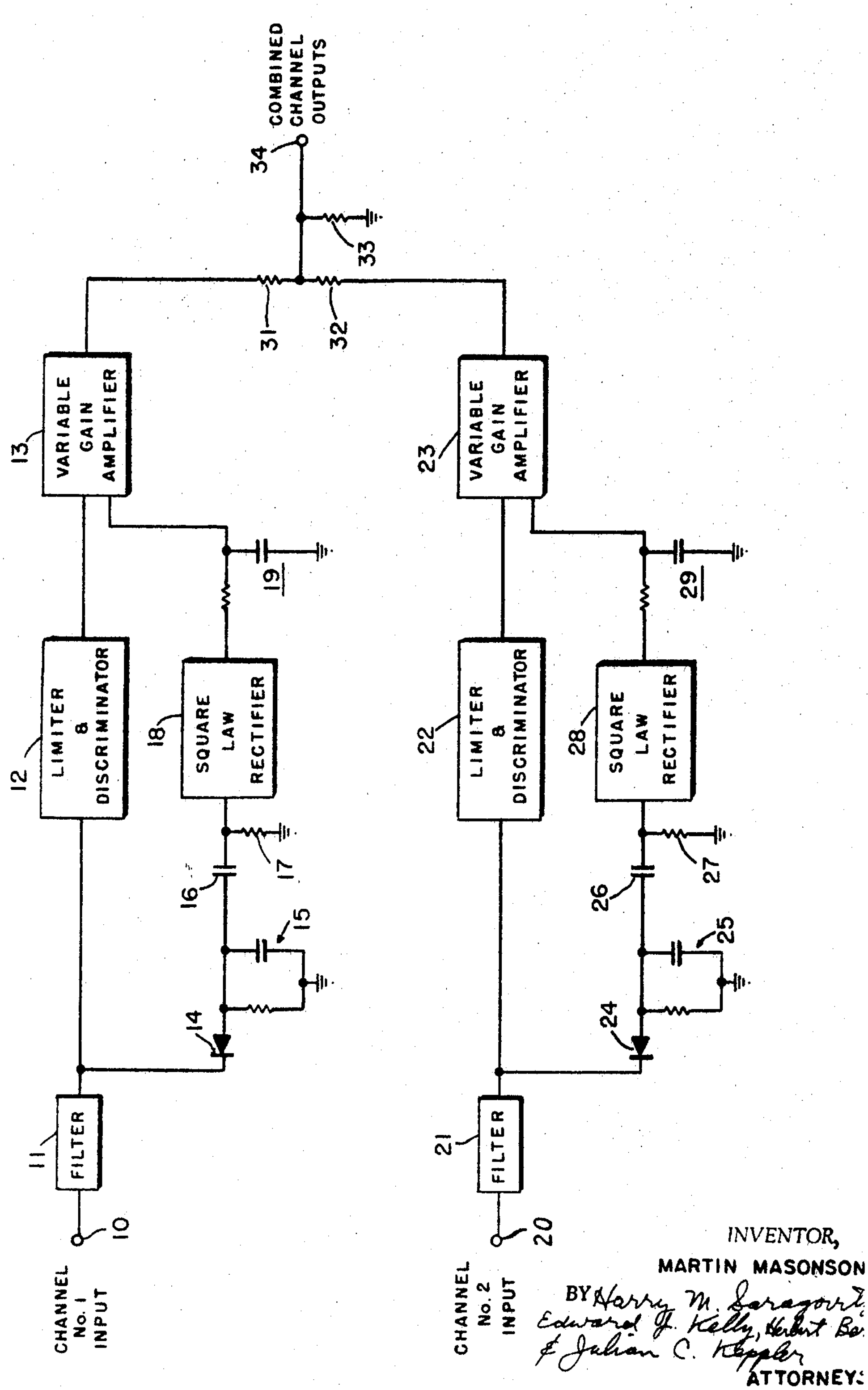
INVENTOR,
MARTIN MASONSON
BY Harry M. Saragovitz, Edward J. Kelly, Herbert Ber & Julian C. Keppler
ATTORNEYS United States Patent Office 3,475,688
Patented Oct. 28, 1969

3,475,688

MULTICHANNEL RECEIVING SYSTEM IN WHICH EACH CHANNEL'S WEIGHT IN THE COMBINED OUTPUT DEPENDS ON THE RATE OF FADING IN SAID CHANNELS

Martin Masonson, Nutley, N.J., assignor, by mesne assignments, to the United States of America as represented by the Secretary of the Army Filed Jan. 18, 1966, Ser. No. 521,461
Int. Cl. H04b *1/10*
U.S. Cl. 325—305 4 Claims

ABSTRACT OF THE DISCLOSURE

A diversity combiner which utilizes the rate at which a signal is varying in any given channel to determine the weight given to that channel in the combined output. In each channel the envelope of the carrier is detected, differentiated, rectified and applied to an amplifier to control the gain in the channel. All the channels are combined to produce a single output.

This invention relates to a diversity receiving system and, more particularly, to a diversity receiving system in which the weight given to each diversity channel in the combined output depends on the rate of fading in that channel.

Diversity systems make use of the fact that signals which travel independent paths or which are transmitted at different frequencies rarely possess similar fading characteristics. In some systems only the channel having the strongest signal or the channel having the greatest signal-to-noise ratio is connected to the output of the receiver. In other systems the outputs of a plurality of channels are combined to form the output signal. Many prior art methods exist for determining the manner in which the channels are combined. It is common practice in combining the outputs of a plurality of channels to weight any given channel (control the channel gain) in one of several ways according to the signal strength and/or average power in that channel. The justification is that the higher the signal level in a channel the more reliable is the signal. This practice is valid but ignores an important factor on all types of fading transmission systems. This factor is the rate at which the signal level is varying. Analysis shows that a high level signal having a fast rate of fading might be inferior to a lower level signal having lower rate of fading and, hence, that the latter should receive the greater weight.

The present invention introduces a new factor in weighting the signals in various channels prior to the step of combining the signals. The diversity combiner disclosed herein is intended for use in HF, Tropo, and microwave line of sight applications. It utilizes the rate at which the signal is varying in a given channel to determine the weight to be given to that channel. In each channel the envelope of the carrier is detected. The derivative of the envelope of the detected signal is rectified and the resulting D.C. voltage is applied as a bias voltage to an amplifier in that channel to control the gain thereof. The gain in each channel is therefore under the control of an "AVC" type circuit which, however, responds to the derivative of the fading envelope as a measure of fading rate. All of the channels in the receiver are similarly weighted before being combined to form the signal output.

It is therefore an object of the present invention to provide an improved method of combining the outputs from the various channels of a diversity receiver system.

Another object of this invention is to weight the signal in each of the various channels of a diversity receiver in accordance with the rate with which that particular signal is fading.

These and other objects and advantages of this invention will become more apparent from the following description taken in conjunction with the drawing in which the figure shows a circuit diagram of the diversity combining system of this invention.

The circuit diagram shown in the figure is one method of providing the desired control in a typical frequency shift keying system employing dual diversity. Space, frequency or other diversity input signals are applied to channel No. 1 input terminal 10 and channel No. 2 input terminal 20. Channel No. 1 comprises a filter 11, limiter and discriminator 12 and a variable gain amplifier 13 while channel No. 2 comprises a filter 21, limiter and discriminator 22 and a variable gain amplifier 23. The outputs from channels No. 1 and No. 2 are applied through resistors 31 and 32 respectively and are summed across resistor 33. The combined channel outputs therefore appear at terminal 34.

Each channel has a circuit which determines the rate at which its associated signal is fading. Since these circuits are identical only that of channel No. 1 will be described, the second number in the reference numerals of both channels being identical for similar components.

The envelope of the fading carrier in each channel is detected by conventional means such as diode 14. After the detected signal is smoothed by R-C circuit 15 the derivative of the envelope is produced by a differentiating network comprising capacitor 16 and resistor 17. Since the derivative is an A.C. signal, it is rectified by a suitable device 18 which preferably possesses square law characteristics. However, the rectifier 18 could possess any other rectifying characteristic.

The single polarity derivative signal is averaged by the R-C circuit 19 and applied to the variable gain amplifier 13. As the rate of fading increases a larger negative bias voltage is applied from summing circuit 19 to the variable gain amplifier 13 to decrease the gain thereof. During those periods when the signal in one channel is fading at a rapid rate, and if that rate is greater than the rate of fading in the other channels, the signal from that channel will contribute less than the other channels to the combined channel outputs appearing at terminal 34.

What is claimed is:

1. A diversity receiving system comprising: a plurality of radio receiver channels each of which consists of a first detector means and a variable gain amplifier connected in series; an input signal connected to the input of each said first detector means; means connected to each of said amplifiers to combine the outputs thereof; second detector means connected to each of said inputs for detecting the envelope of the carrier signal applied to that channel; means to differentiate the output from each of said second detector means; means for rectifying the output from each of said differentiating means; and means for applying the output from each of said rectifying means to a gain control input of said amplifier to control the gain thereof.

2. A diversity receiving system comprising: a plurality of radio receiver channels each of which consists of a filter section having an input terminal and an output terminal, a limiter an discriminator section and a variable gain amplifier connected together in series in the named order; an input signal connected to the input terminal of each said filter section; means for combining the outputs of all of said variable gain amplifiers; means in each of said channels connected to the output terminal of said filter section for detecting the envelope of said input signal; means connected to said detecting means for differentiating the output thereof thereby producing a voltage the amplitude of which is proportional to the rate at which the signal is fading in that channel, said voltage being applied to an input terminal of said variable gain amplifier to control the gain thereof.

3. A diversity receiving system comprising: a plurality of radio receiver channels each of which consists of a filter section, a limiter and discriminator section and a variable gain amplifier connected together in series in the named order; an input signal connected to the input of each said filter section; means for combining the outputs of all of said variable gain amplifiers; detector means the input of which is connected to the output terminal of said filter section for detecting the envelope of said input signal; means connected to said detector means for differentiating the output thereof and rectifier means for applying the output from said differentiating means to an input of said variable gain amplifier to control the gain thereof.

4. A diversity receiving system as set forth in claim 3 wherein said rectifier means comprises a square law rectifier and an averaging means connected in series circuit.

References Cited

UNITED STATES PATENTS

| | | | |
|---|---|---|---|
| 2,679,554 | 5/1954 | Hurford | 330—147 X |
| 2,799,734 | 7/1957 | Camp | 330—136 X |
| 3,150,327 | 9/1964 | Taylor | 330—134 X |
| 3,189,842 | 6/1965 | Quitther | 330—136 X |
| 2,236,497 | 4/1941 | Beers | 325—404 |
| 2,305,917 | 12/1942 | Beers | 325—305 |

ROBERT L. GRIFFIN, Primary Examiner

R. S. BELL, Assistant Examiner

U.S. Cl. X.R.

325—404, 414; 330—136